(12) United States Patent
Garton et al.

(10) Patent No.: US 6,193,099 B1
(45) Date of Patent: *Feb. 27, 2001

(54) ROTATIONALLY MOLDED PART HAVING INTEGRALLY FORMED REINFORCEMENT

(75) Inventors: Darwin Garton, Malcolm, NE (US); Todd Bolzer, Jonesboro, AK (US)

(73) Assignee: Snyder Industries, Inc., Lincoln, NE (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/280,306

(22) Filed: Mar. 29, 1999

(51) Int. Cl.$^7$ .................................................. B65D 6/34
(52) U.S. Cl. ......................... 220/645; 220/644; 220/675
(58) Field of Search .................................. 220/645, 644, 220/653, 675, 671, 670, 565, 660

(56) References Cited

U.S. PATENT DOCUMENTS

| | | |
|---|---|---|
| 3,442,418 * | 5/1969 | Stromberg ............................ 220/645 |
| 3,446,394 | 5/1969 | Miller et al. . |
| 3,650,501 | 3/1972 | Streb . |
| 3,804,324 * | 4/1974 | Sinn et al. ............................ 494/14 |
| 3,912,103 | 10/1975 | Gerhard . |
| 4,274,548 * | 6/1981 | Schneider ............................ 220/675 |
| 4,356,925 | 11/1982 | Gerhard . |
| 4,445,624 | 5/1984 | Gill . |
| 4,840,282 | 6/1989 | Gerhard . |
| 4,899,901 | 2/1990 | Nickel . |
| 4,923,081 * | 5/1990 | Weaver et al. ....................... 220/645 |
| 4,989,741 | 2/1991 | Dull et al. . |
| 5,330,071 * | 7/1994 | Parker ................................. 220/645 |
| 5,544,777 | 8/1996 | Watson . |
| 5,688,086 | 11/1997 | Menzemer et al. . |

FOREIGN PATENT DOCUMENTS 2082881   12/1971   (FR) .

* cited by examiner

Primary Examiner—Stephen Castellano
(74) Attorney, Agent, or Firm—Hovey Williams Timmons & Collins

(57) ABSTRACT

A method of rotationally molding a part to include a platform therein is provided. The method includes providing a mold and mounting the platform adjacent to, and preferably connected to the wall of the mold. Resin is deposited in the mold and the mold is closed. The mold is heated and rotated around at least two axes. The molten resin substantially covers the interior wall of the mold and the portion of the platform exposed therein. Rotation continues as the mold is cooled whereby the resin solidifies into a self-sustaining configuration. The resulting part is removed with the platform receiving resin thereon incorporated in the part resulting in a reinforcement oriented in spanning relationship to an interval defined by spaced-apart regions on the mold wall. The placement of the platform may be selected, whereby the resin and platform provide structural reinforcements for the part, lifting points incorporated into the part, or electrical grounding sites which are formed during molding.

12 Claims, 4 Drawing Sheets

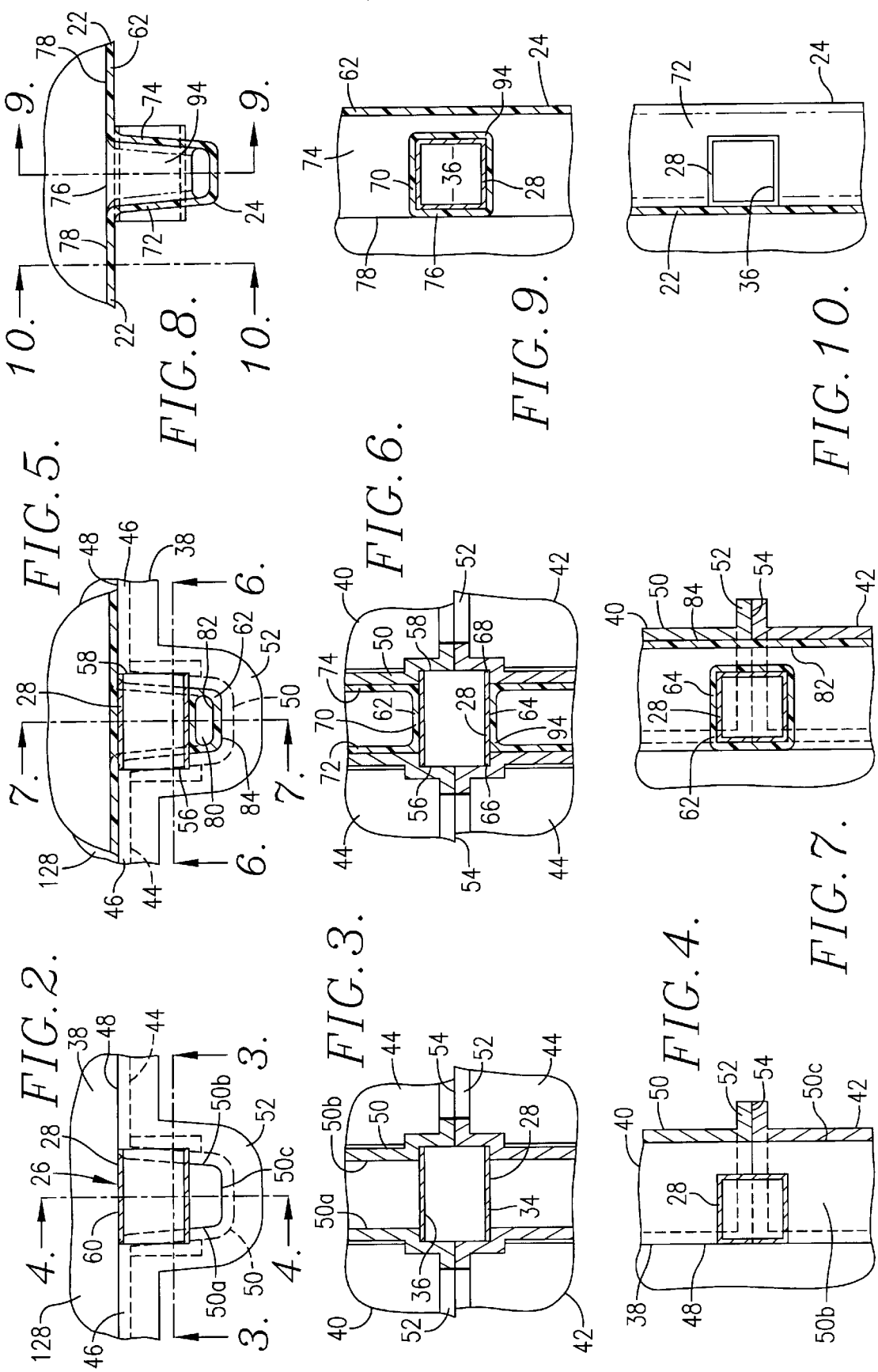

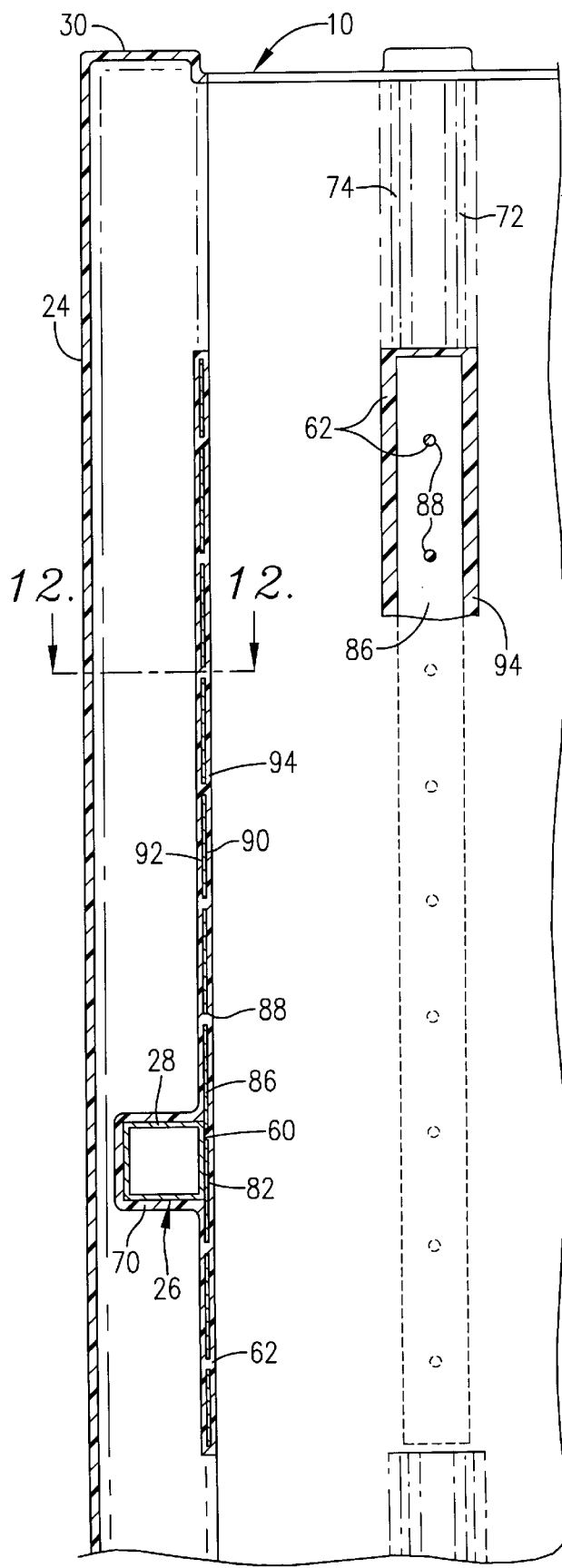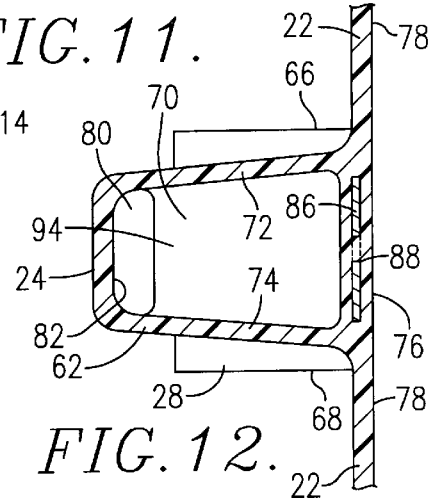
FIG. 11.
FIG. 12.
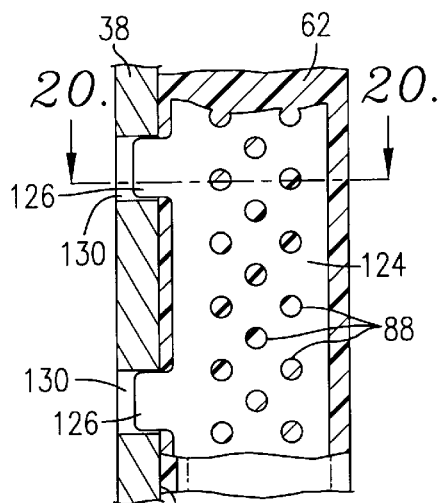
FIG. 19.
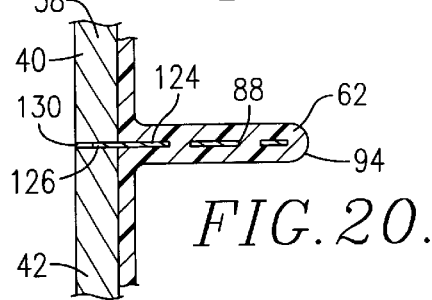
FIG. 20.
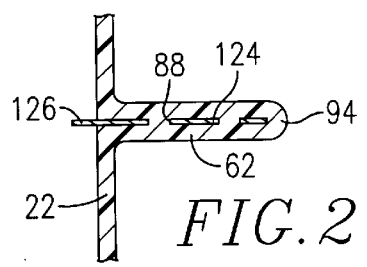
FIG. 21.

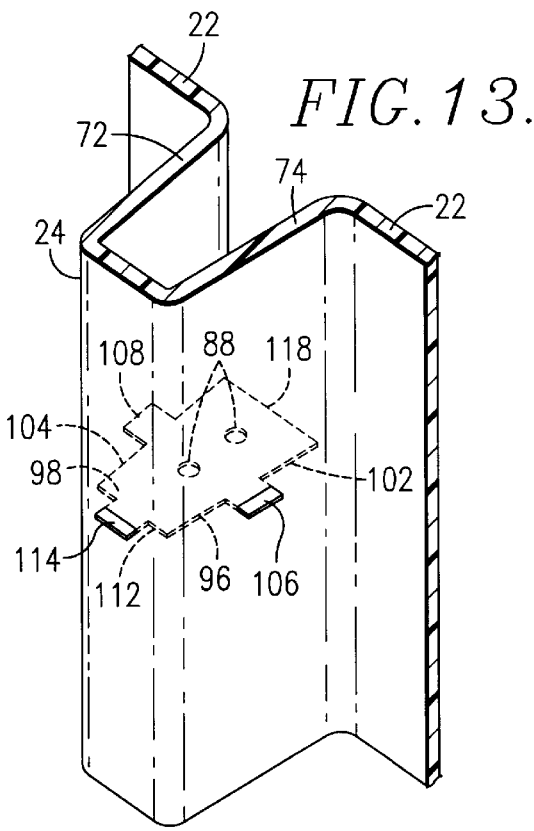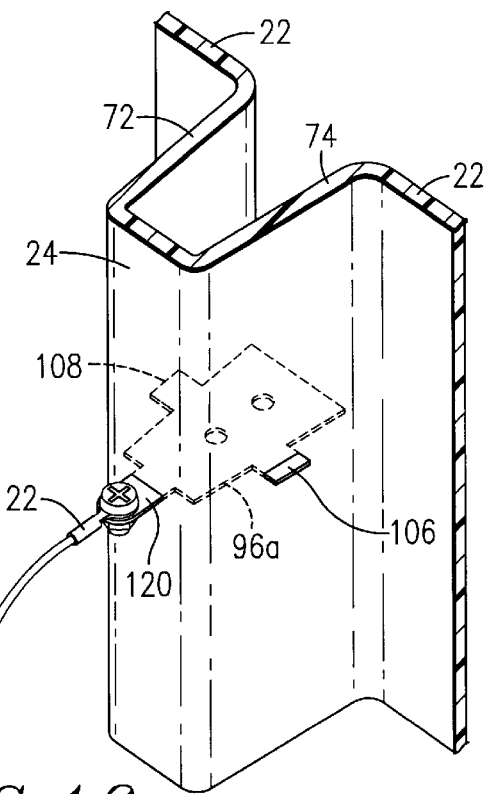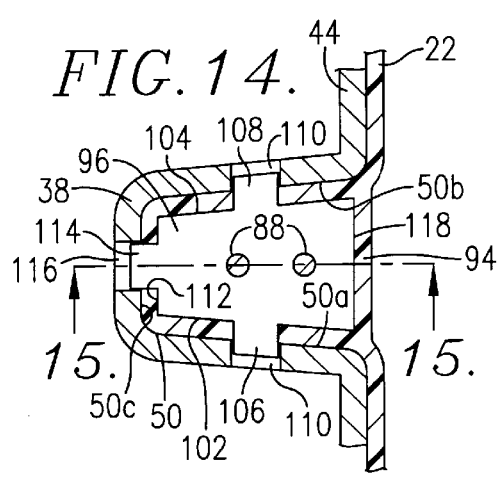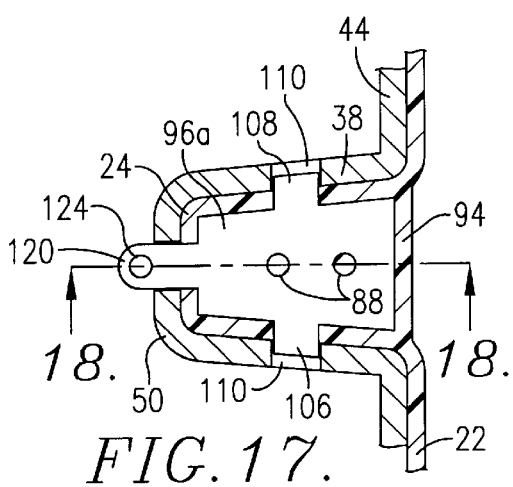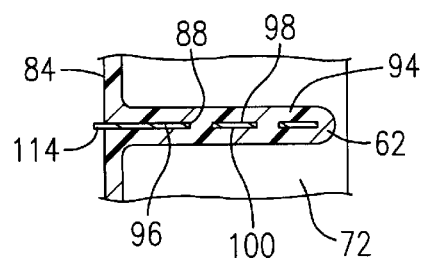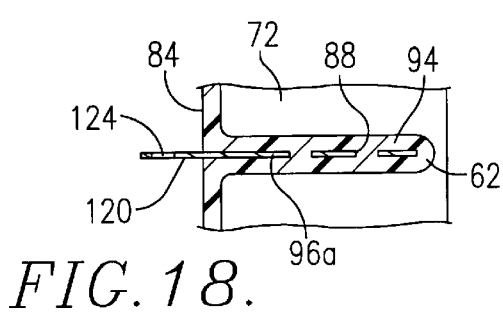

ROTATIONALLY MOLDED PART HAVING INTEGRALLY FORMED REINFORCEMENT

BACKGROUND OF THE INVENTION

1. Field of the Invention

This invention concerns a method for forming raised or reinforced regions on a rotationally molded part, such as a tank or vessel. More particularly, it is concerned with a process whereby a platform is provided within the mold and incorporated in the molded part to present a rib which structurally reinforces the part.

2. Description of the Prior Art

Rotational molding, as recognized by those in the art, is a process which is useful in forming parts from synthetic resin materials. The process of rotational molding is characterized by the provision of a mold separable into at least two mold sections, into which synthetic resin, such as polyethylene, is placed. Although heated liquid synthetic resin can be employed, the synthetic resin is typically provided in powdered or other solid form. By heating the mold within an oven-like chamber while the mold is rotated, preferably around more than one axis, the synthetic resin particles are distributed throughout the mold, thereafter melting to a gooey consistency when engaging the heated mold. The rotation of the mold results in the resin particles being substantially evenly distributed, with the resin filling in cavities in the mold and conforming to the interior configuration of the mold. Once the melting and distribution is complete, the mold is removed from the oven and cooled while rotation continues. Such cooling may be in ambient air temperature well below the melting point of the synthetic resin, or accelerated by the use of cooling water in hot environments.

Heretofore, molded articles have been provided with ridges or gussets through the use of kiss-offs or kiss-throughs. A kiss-off is that area of the molded part where two mold surfaces are separated by a sufficiently small distance that the resin collecting on the mold surfaces bridges the gap therebetween. A kiss-through is that area of the molded part where mold surfaces of two mold sections meet, thereby forming an opening in that area of the molded part where the mold surfaces met.

However, as increasing demands have been made on rotationally molded parts in regard to capacity, lifting strength, ability to resist compression, and resistance to impact, there has grown a need to provide for reinforcement in the form of ribs which may be formed in the parts to meet those demands. Such ribs would preferably be formed to provide additional material and strength, and could be molded into the part in areas where kiss-offs would be impractical.

SUMMARY OF THE INVENTION

The demands for an improved rotational molding process for forming a reinforcement which meets these demands has largely been met by the present invention. That is to say, the present invention provides for an improved reinforcement which is not only capable of location in a variety of positions, incorporates the platform into the finished part, and coats and effectively integrates the platform from being a component of the mold into the part in a rotational molding process. The reinforcement may use a metallic material as a platform even in corrosive environments because of the ability of the resin to coat the platform portion exposed within the interior of the mold and thus the interior of a containment vessel molded thereby. The nature of the process of rotational molding involving substantial dynamic balancing of the mold and the difficulty of positioning removable mold components within the mold is circumvented by the use of lightweight platforms which remain with the part. Furthermore, because of the size and type of parts typically produced by rotational molding, the capabilities now offered by the present invention represent substantial improvements over the prior art.

The present invention broadly employs a platform onto which synthetic resin may be deposited. The platform is connected to the mold used in a rotational molding process which is conventional except for that it is configured to hold the platform during the molding process and then release the platform therefrom during removal of the part. The mold is thermally connected to and directly proximate the platform so that heat from the mold is transferred by conduction and, to a lesser extent, radiation to the platform.

After the resin is deposited within the mold and the latter is securely closed and coupled to a conventional rotational molding machine, the mold is rotated and inserted into a heated room or chamber. The mold is rotated on two or more axis to thoroughly distribute the resin throughout the mold. The platform is effectively a part of the mold, but is coated with resin on the portions exposed within the mold, a part of the platform being masked by the mold against the deposit of resin thereon. Once the resin becomes molten and viscous so as to thoroughly and evenly coat the interior of the mold and the exposed portion of the platform, the mold is cooled. After cooling of the mold and the part formed therein to a sufficient temperature, the mold, typically in two or more mold sections, is removed from the rotational molding machine and separated. The part can be removed, with the platform remaining with the part.

As a result, a variety of improvements in the nature of rotationally molded parts, and in particular bulk containers, can be provided. For example, the present invention allows the use of lifting or hoisting tubes to be directly incorporated at a variety of locations which strengthen the part both with regard to internal and externally applied forces. Baffles can be placed at a number of locations around the interior of the mold and thus the part or parts to be molded. Gussets and other reinforcements may be formed which incorporate the properties of both the material used as the platform and the synthetic resin. By using perforate platforms or filament mats as platforms, the platform is both effectively adhered and mechanically more securely incorporated into the part. Particular advantages and applications in the parts made in accordance with the present invention will be readily apparent with respect to drawings and detailed description which follows.

BRIEF DESCRIPTION OF THE DRAWINGS

FIG. 2 is a fragmentary plan view of a mold for fabricating a rotationally molded bulk container as shown in FIG. 1 taken along the flange line between mold sections to show a platform in position in the U-shaped rib area;

FIG. 3 is a vertical sectional view taken along line 3—3 of FIG. 2, showing the platform in place between upper and lower mold sections at the flange line;

FIG. 4 is a vertical sectional view taken along line 4—4 of FIG. 2, showing the platform in place between upper and lower mold halves;

FIG. 5 is a fragmentary horizontal sectional view through a rib and showing the mold in plan at the flange line similar to FIG. 2, showing the platform in place at the rib area and synthetic resin material rotationally molded onto the mold and platform to form the rib and a cavity around the platform;

FIG. 6 is a vertical sectional view taken along line 6—6 of FIG. 5, showing the platform in place and synthetic material rotationally molded thereon between the upper and lower mold halves;

FIG. 7 is a vertical sectional view taken along line 7—7 of FIG. 5, showing the platform in place between the upper and lower mold halves, and synthetic resin material molded onto the platform and mold halves;

FIG. 8 is a fragmentary horizontal section through the rib shown in FIG. 5 with the mold removed and the platform molded in place;

FIG. 9 is a vertical sectional view taken along line 9—9 of FIG. 8, showing the platform molded into the rib;

FIG. 10 is a vertical sectional view taken along line 10—10 of FIG. 8, showing the rib and platform in elevation;

FIG. 11 is a fragmentary vertical sectional view of a rotationally molded container of the type shown in FIG. 1, showing a normally horizontally oriented tubular platform in combination with a normally vertically extending foil platform connected to the tubular platform and molded into the rib of the frame, one rib being shown in section and another in elevation with portions of the synthetic resin on the inside of the rib;

FIG. 12 is a fragmentary horizontal section along line 12—12 of FIG. 11, showing the tubular platform in combination with a foil platform molded into the rib of the frame;

FIG. 13 is a fragmentary perspective view of a rib of a container frame showing a horizontally oriented thin perforate platform molded in place mostly in broken line and located substantially within the channel formed by the U-shaped rib;

FIG. 14 is a fragmentary horizontal section through the rib of FIG. 13 and on the platform surface, showing the mold for the rib in section and the platform in plan;

FIG. 15 is a fragmentary vertical section along line 15—15 of FIG. 14 after removal of the part from the mold, showing a horizontal gusset molded around the thin perforate platform;

FIG. 16 is a fragmentary perspective view of a rib of a container frame similar to FIG. 13, showing a horizontally oriented thin perforate platform shown mostly in broken line and having a grounding tab projecting through the rib into which the platform is molded and attached to a ground wire;

FIG. 17 is a fragmentary horizontal section through the rib of FIG. 16 and on the platform surface, showing the mold for the rib in section and the platform in plan with the ground wire unattached;

FIG. 18 is a fragmentary vertical section along line 18—18 of FIG. 17 after removal of the part from the mold, showing a horizontal gusset molded around the platform and the tab projecting externally from the rib;

FIG. 19 is a fragmentary view of a rotational molding mold section and a narrow internal normally horizontal rib molded around a foil platform and projecting into the interior of the frame of the container, with the foil platform supported by the mold section and synthetic resin of the rib in the openings of the perforate foil platform;

FIG. 20 is a fragmentary horizontal sectional view taken along line 20—20 of FIG. 19, showing the foil platform held between two mold sections and the molded rib;

FIG. 21 is a fragmentary horizontal sectional view similar to FIG. 20 but with the mold removed;

DESCRIPTION OF THE PREFERRED EMBODIMENT

Figure 1:
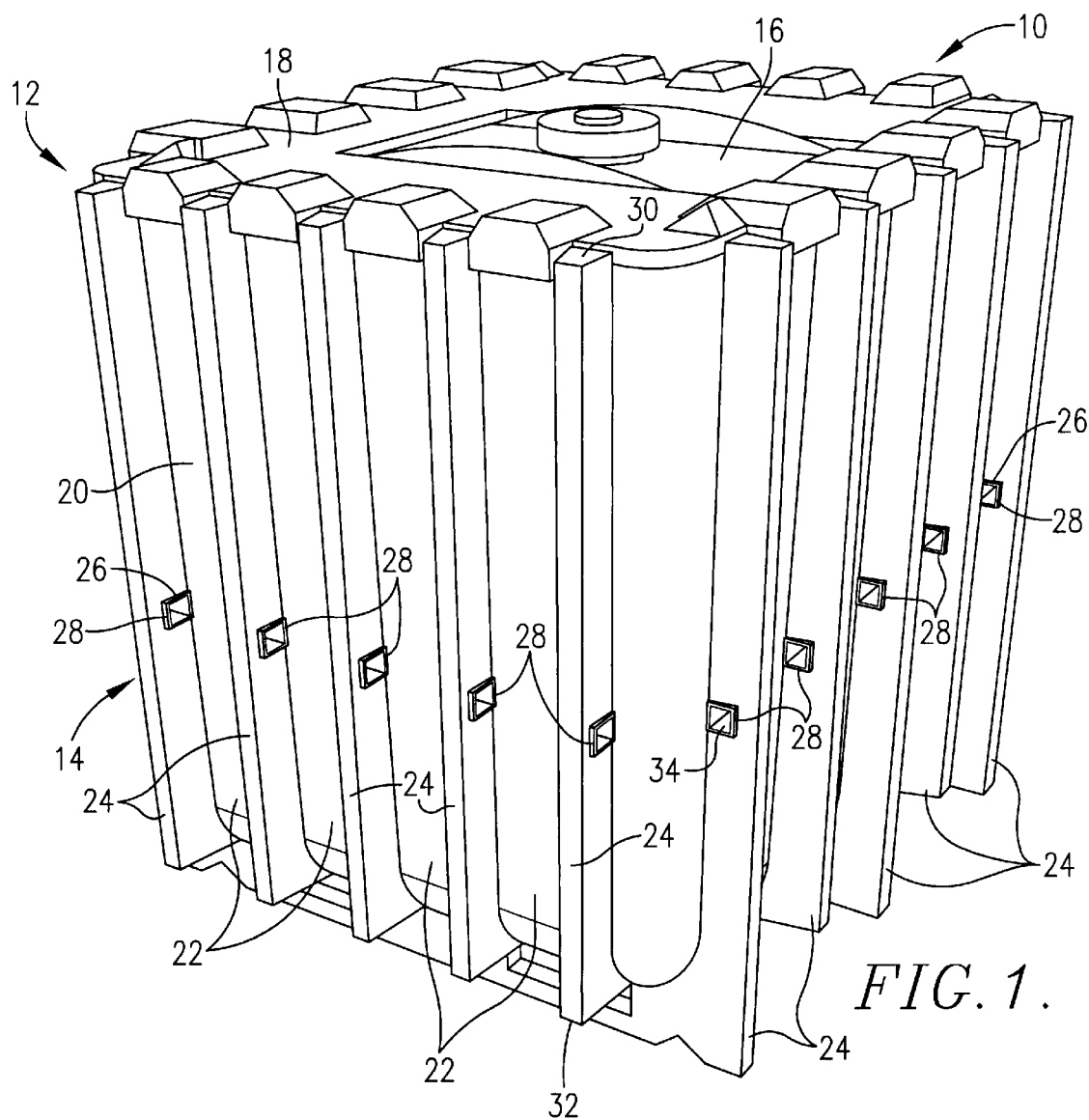
FIG. 1 is a perspective view of a rotationally molded bulk container having a frame with tubular platforms molded into surrounding vertical ribs and a cover for the frame.

Referring now to the drawing, one example of a part 10 which may be rotationally molded in accordance with the process of the present invention is a frame 14 of a container 12 as shown in FIG. 1. Container 12 is assembled of components broadly including the frame 14 which surrounds and protects a tank 16 held within the interior of the frame 14, and a cover 18 positioned over the tank 16 and frame 14, with a portion of the tank 16 visible in the center of the cover 18. The frame 14 includes a sidewall 20 which includes panels 22 and generally upright ribs 24. The ribs 24 alternate with the panels around the circumference of the sidewall 20 and serve not only to protect the frame and tank within from damage, but also provide structural rigidity and extend downwardly to support the bottom wall of the container 12 above a supporting surface. A platform 26 is molded into the ribs, providing a surface on which resin may be deposited and conform thereto, resulting in a reinforcement or other structural member giving enhanced structural rigidity against deformation of the sidewall 20, as well as other advantages as discussed herein. The platform 26 extends into the interior of the mold during the rotational molding process, and bridges or spans an interval between different, spaced-apart regions on the wall of the mold.

One particular platform 26 which is especially advantageous is a tubular platform 28 which is the subject of FIGS. 1 through 10. As shown in FIG. 1, the tubular platforms 28 are positioned between the top 30 and bottom 32 of each respective rib 24 so that the tubular platforms 28 are at a common elevation. Each of the tubular platforms 28 include a tubular wall 34 which may be arcuate, rectangular as shown, or of other configurations, and surrounds and define a bore 36 therein, with the bores along any wall being in linear alignment so that a straight post or rod may be inserted through a plurality of the bores 36, which in turn may be used for lifting and supporting the container.

Turning to FIGS. 2, 3 and 4, a mold 38 is illustrated which is configured for rotationally molding the frame 14 in the mold cavity therein. As may be seen in FIGS. 3 and 4, each mold 38 has at least two mold sections, shown herein as upper mold section 40 and lower mold section 42. Alternatively, the mold 38 for the frame 14 as shown in FIG. 1 could have each mold 36 include separate laterally separable portions. Only one region of the mold 38 is shown, it being understood that this region would be the same for forming each rib in the vicinity of the platform and the remainder being conventional. The mold 38 has a mold wall 44 having spans 46 with a flat inner surface 48 for forming the panels 22 and U-shaped corrugations 50 including respective first and second side faces 50a and 50b defining an interval therebetween and back face 50c for forming each rib 24. The mold sections 40 and 42 have flanges 52 which meet and receive fasteners such as coupling bolts therethrough, and are separable along a flange line 54. The corrugations 50 include laterally spaced and opposed recesses 56 and 58 for receiving therein the tubular platform 28 as shown in FIGS. 2, 3 and 4. The recesses are shown positioned along the flange line for ease of separation, but could be positioned in spaced relationship to the flange line 54 if desired. The mold sections are typically of mild steel, stainless steel or aluminum which provides good strength to weight and good heat conductivity with the thickness varying based on the size of the part and the material being used and is typically between about 1/16 to 1/2 inch thickness. The tubular platform is preferably of metal such as mild steel, aluminum, or stainless steel if improved corrosion resistance is sought, and may be of different thicknesses according to the size of the part, but one example would be 12 gauge steel. Alternatively, the rib may be formed of ceramics, fibrous glass or metal, or even synthetic resin, although metal is preferred because of enhanced heat conductivity.

Initially, the tubular platform 28 is placed in the recesses 56 and 58 as shown in FIGS. 2, 3 and 4 whereby an interior face 60 of the tubular platform is coplanar with the inner surface 48 of the mold sections 40 and 42 as shown in FIG. 4. Powdered synthetic resin such as polyethylene is then placed within the mold, although liquid polymer or other synthetic resins could also be used as a starting material. The mold sections 40 and 42 are then secured together by bolts and secured to a rotational molding machine, as is conventional, and placed in a heated room or oven where the temperature is above the melting temperature of the resin. As the mold is rotated on two or more axis, the room is heated to, for example, about up to 700° F., and consequently the heat of the room is transferred to the metal mold 38. The temperature of the mold is transferred to the platform 26 by conduction and, to a lesser degree, radiation. As the temperature of the mold 38 and platform rises, typically to about 450° F. for polyethylene, the synthetic resin begins to melt and collect on the mold wall 44 and on the platform 28. The synthetic resin is not heated to a fully liquefied state, but rather to a thick viscous molten condition.

FIGS. 5, 6 and 7 show the part 10, in this case the frame 14, formed within the mold by the deposit of the resin 62 thereon. The resin 62 coats the inner surface of the mold 36 and surrounds the exposed portion 64 of the tubular wall 34 of the platform 28 without covering the ends 66 and 68 thereof, which are received within and protected by the recesses 56 and 58. In flowing around the exposed portion 64 of the tubular wall 34, the resin 62 forms a gusset 70 which extends between the side bulkheads 72 and 74 of the rib 24 formed by the resin within the corrugation 50 of the mold 36. Notably, the resin 62 forms the inner surface 76 of the gusset 70 which is coextensive and substantially coplanar with the inner wall 78 of the panel 22, thereby minimizing stress regions in the frame 14. In addition, a gap 80 is defined between the back surface 32 of the gusset 70 and the interior side 82 of the outer face 84 of the rib 24. After the powdered resin is sufficiently melted and distributed so that the resin is deposited into the condition shown in FIGS. 5, 6 and 7, the mold 36 is removed from the heated room, but rotation of the mold 38 continues during cooling to maintain an even thickness of the deposited resin. Once the mold is sufficiently cooled, either by exposure to ambient air or water spray if necessary in hot climates, so that the resin is solidified and self sustaining, the mold 38 may be removed from the rotating arm or left in place, and the mold sections uncoupled so that the part 10 may be removed. The resulting frame 14 is shown in FIG. 1, with the specific area of the platform 28 and gusset 70 shown in FIGS. 8, 9 and 10. As it may be seen, the resin 62 provides adhesion and mechanical connection to hold the tubular platform 28 in position, while the tubular platform 28 provides a surface on which resin is deposited and preferably conducts heat to aid in melting the resin. The platform 26 can be located in a variety of positions within the mold 36, but it is most advantageous if the platform 26 has good proximity to and thermal conductivity with the mold wall 44. Unlike traditional kiss-offs or kiss-throughs, the platform 26 remains with and is integrally formed with the reinforcing gusset, thereby adding mass and strength as it remains with the rib and becomes an integral part thereof.

A modified version of platform 26 is shown in FIGS. 11 and 12 wherein the platform 26 includes both tubular platform 28 and an upright sheet platform 86 is provided. The sheet platform 86 is shown affixed to the interior side 82 of the tubular platform 28 by, for example, welding, brazing, rivets or other fasteners. Alternatively, the sheet platform 86 may be held in place by a portion thereof projecting through a flange line in the mold, held in position by adhesive to temporarily hold the sheet platform to the mold wall, or by the use of bolts or other fasteners to attach the sheet platform 86 to the mold wall. In such instances, the tubular platform 28 might be omitted, and the sheet platform 86 would be wider than the lateral side distance across the configuration. As shown, the sheet platform 86 has a slightly narrower span than the lateral distance across the corrugation 50 between the bulkheads 72 and 74, and extends partially, though not completely, the vertical distance between the top 30 and bottom 32 of the rib 24 so as to permit resin 62 to coat the sheet platform 86 and the tubular platform 28, as well as forming the rib 24 within the corrugation 50. The sheet platform 86 is preferably provided with perforations 88 which enhances the practice of the present method by permitting good and even thickness of the deposited resin on both the interior facing side 90 and rib facing side 92 of the sheet platform 86. The resin 62 thus collects on the sheet platform 86 and the tubular platform 28, passing through the perforations 88 and providing a reinforcement 94. The encasement of metal sheet platform 86 and tubular platforms 28 exposed within the interior of the frame helps the frame 14 to resist the corrosive effects of certain chemicals which may condense or otherwise be deposited thereon.

FIGS. 13 through 15 illustrate another application of the present method which employs a platform 26 to provide a reinforcement 94. In the embodiment of the platform 26 shown in FIGS. 13 through 15, a thin flat sheet 96 serves as the platform 26 and is horizontally oriented. A multiplicity of such sheets 96 can be positioned in vertically spaced superposed relationship within the rib 24. The sheets 96 are preferably metal, and may be, e.g., aluminum foil or heavier gauge sheet metal, and preferably though not necessarily provided with perforations 88. The metal sheets 96 include a top surface 98 and a bottom surface 100 and are preferably, though not necessarily perforate. The sheet 96 has side margins 102 and 104 which are spaced interiorly relative to the side faces 50a and 50b of the mold wall 44 forming the corrugation 50, with the exception of ears 106 and 108 which are received in openings 110 in the side faces 50a and 50b. Similarly, the sheet 96 has an outer edge 112 which is spaced interiorly of the back face 50c of the mold wall 44 except for the finger 114 which extends into and is held in position by opening 116. The openings 110 and 116 may, but need not be, located at the flange line 54 as the thin metal sheet 96 may be deformed sufficiently to permit the insertion of the ears and finger into their respective openings. Inner edge 118 is preferably positioned whereby the resin coating is substantial enough to provide good coating and reinforcement, and in all other respects the process is as described above with respect to deposit of resin, heating, cooling and mold removal. Because of the thin and deformable character of the sheets 96, the portion of the finger and ears which protrude from the rib 24 as shown in FIG. 13 may be trimmed or left in place, with the resin providing sufficient adherence and contact to provide good contact between the sheet 96 and the resin.

The use of a platform 26 to form a reinforcement 94 as shown in FIGS. 16 through 18 is very similar to that shown in FIGS. 13 through 15, except the sheet 96a is necessarily provided of a sufficient thickness and is necessarily of metal so that a tab 120 is capable of durably accepting an electrical connector. The tab 120 projects farther outwardly of the resin part of the rib 24 than the finger 114, to permit attachment of the tab 120 to a ground wire 122. The provision of a hole 124 or otherwise configuring tab 120 for connection to the ground wire 122 enables electrical grounding of the container 12. Ordinarily, only one such grounding tab 120 per container 12 is necessary, and thus when removing the frame 14 from the mold 38, care is taken to laterally separate or tilt the frame 14 from a mold section to avoid breaking or deforming the tab 120.

FIGS. 19 through 21 illustrate the use of a platform 26 not associated with a rib 24 but which nevertheless permits formation of a reinforcement 94. An elongated shelf-type platform 124 is provided which includes tabs 126 for holding the shelf-type platform 124 in place within the interior cavity 128 of the mold 36. The tabs 126 are preferably received within recesses 130 formed along the mold wall 44, and the recesses can be positioned at circumferentially spaced intervals along the flange line 54 or merely deformed when the frame 14 is removed from the mold. The shelf-type platform can be of foil or light-gauge sheet metal, and provided with perforations 88. Other, non-metallic materials may be used for the platform 26, such as solid resin of the same or a different polymer or ceramics, but because of reduced ability to conduct heat, may extend only a short distance from the mold wall 44 in order to be effectively coated with resin 62. Further, the shelf-type platform 124 may extend around the entire interior perimeter of the mold wall 44 or only a portion thereof, such as along the spans 46 forming the panels 22. The shelf-type platform 124 provides a good reinforcement 94 resisting deflection of the sidewall 20 under load in the absence of any ribs 24 and without the need for kiss-offs. The perforations 88 permit good resin flow, mechanical connection and adhesion while the metallic shelf-type platform gives sufficient heat transfer to enable the deposited resin to melt thereon. Molding and removal from the mold is accomplished as above, with the mold 38 holding the shelf-type platform 124 in FIG. 20 and the mold removed in FIG. 21.

Figure 22:
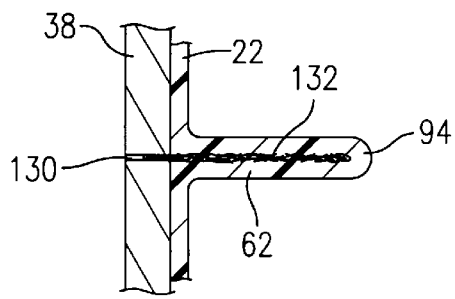
FIG. 22 is a fragmentary horizontal sectional view similar to FIG. 20, wherein a fibrous platform is substituted for the foil platform and held by the mold sections whereby a rib is formed onto the platform.
Figure 23:
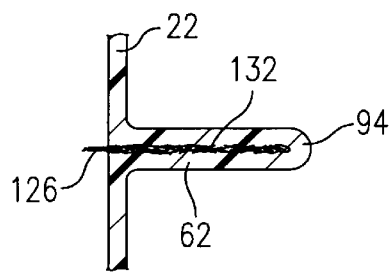
FIG. 23 is a fragmentary horizontal sectional view similar to FIG. 22, showing the rib projecting into the interior of the frame of the container and the mold sections removed.

FIGS. 22 and 23 show the method of the present invention using a shelf-type platform 124 of a woven material 132. Steel wool is one example of a suitable woven material, and graphite or fibrous glass are other materials which could be employed as a platform 26. Steel wool or other woven metallic filaments are preferable, as described above, for their thermal conductivity characteristics. The woven material 126 enables the resin to more completely penetrate therein.

It may be understood by those skilled in the art that the thickness and the type of material used in the platform 26 directly effect the distance from the sidewall 20 the reinforcement 94 may project. Thicker materials with greater thermal conductivity can project farther into the mold 36 than thinner, less thermally conductive materials and still convey sufficient heat to melt the resin 36 deposited thereon. Another factor is the type of synthetic resin to be employed, with materials with a lower melting temperature being generally capable of forming onto platforms 26 projecting farther away from the mold wall 44.

Numerous modifications will now be grasped by one skilled in the art having the benefit of the foregoing disclosure. The particular configuration and placement of the platform 26 may be varied so long as the platform has contact with the mold 38 and is not obstructed so as to prevent the receipt of synthetic resin thereon. As shown with respect to the tubular platform 28, the reinforcement 94 formed thereby may provide a structure for the attachment of a lifting bar or device, providing greater durability than the synthetic resin alone, while also reinforcing the frame 14 against deformation due to internal forces. Moreover, the platforms 26 may be positioned to provide internal baffles and barriers to resist sloshing and splashing of the contents of a vessel, illustrated by the positioning of sheet platform 86 or sheet 96.

What is claimed is:

1. In a rotationally molded part of synthetic resin material having a wall defining an exterior side and an interior side, the wall including first and second proximate wall regions, the improvement comprising at least one platform of a second material oriented at an oblique angle to said first and second regions integrally molded into the wall of said part in spanning relationship between the first and second regions, said platform having a first portion coated with a substantially even thickness of a synthetic resin first material of sutstantially the same thickness as the first and second proximate wall regions on the interior side of said wall, said synthetic resin first material adhesively and mechanically connecting to said platform and forming a reinforcement between said first and second regions and a second portion which extends through said wall and to present an uncoated portion on the exterior side of said wall.

2. A part as set forth in claim 1, wherein said part is a bulk containment vessel having a sidewall surrounding an interior, said platform presenting at least one portion thereof protruding through and exposed exteriorly of said wall.

3. A part as set forth in claim 2, wherein said sidewall presents a plurality of generally upright ribs, said platform being oriented to present a tubular bore extending through said ribs.

4. A part as set forth in claim 3, wherein the portion of said platform incorporated in and interiorly of said sidewall is substantially covered by resin.

5. A part as set forth in claim 1, wherein said wall presents a plurality of generally upright ribs having first and second spaced-apart bulkheads, and including a sheet platform substantially covered by resin in spanning relationship across said first and second bulkheads.

6. A part as set forth in claim 5, wherein said sheet platform has a plurality of perforations therethrough.

7. A part as set forth in claim 6, wherein said sheet platform is a thin metallic sheet oriented horizontally across said upright rib.

8. A part as set forth in claim 6, wherein said sheet platform is a thin metallic sheet oriented substantially upright.

9. A part as set forth in claim 1, said platform including a tab having an electrical ground wire connection on said tab.

10. A rotationally molded part comprising:

a sidewall of a synthetic resin first material, said sidewall having first and second substantially coplanar panels and having at least one rib intermediate said panels and defining an interval therebetween, said rib having bulkheads obliquely angled relative to said panels and an outer face and integrally formed therewith; and a platform of a second material integrally molded into said wall and located intermediate said first and second panels in substantially spanning relationship to said interval, said platform having a first portion substantially coated with said first synthetic resin material of substantially the same thickness as the first and second bulkheads of said wall, said coated first portion of said platform being substantially coplanar with said panels and integral therewith to span said interval and present a reinforcement between said panels and spaced from said outer face and defining an open area between said coated first portion of said platform and said rib.

11. A part as set forth in claim 10, wherein said platform includes at least one perforation and said first synthetic resin material extends through said perforation.

12. A part as set forth in claim 10, wherein said part is a bulk containment vessel having an interior defined within said sidewall, said interior being in communication with said open area.

* * * * *